Figure 1:
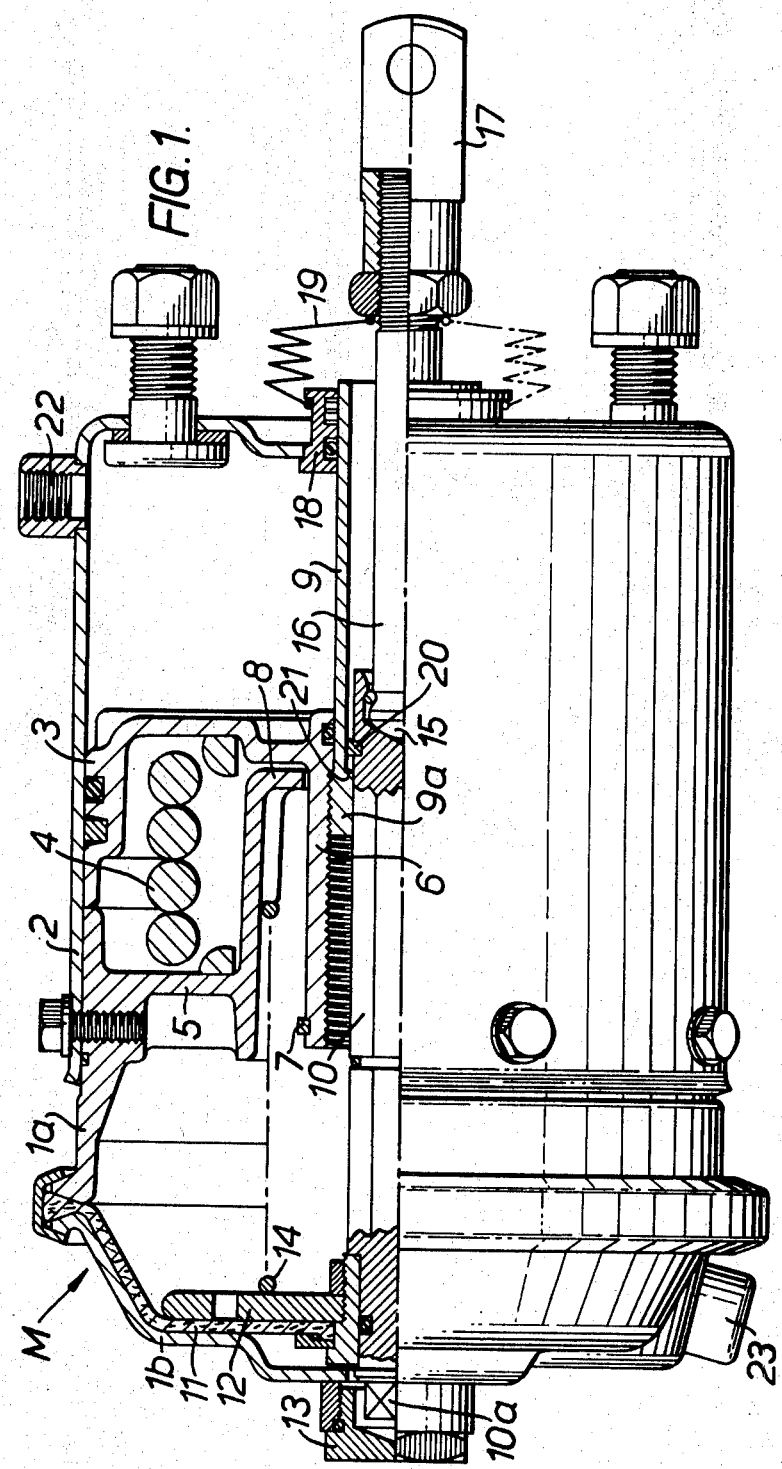

United States Patent

[11] 3,563,139

| [72] | Inventors | Wilbur M. Page<br>Bracebridge Heath, Lincoln;<br>Ralph Coupland, Lincoln, England |
|---|---|---|
| [21] | Appl. No. | 793,703 |
| [22] | Filed | Jan. 24, 1969 |
| [45] | Patented | Feb. 16, 1971 |
| [73] | Assignee | Clayton Dewandre Company Limited<br>Lincoln, England |
| [32] | Priority | Jan. 26, 1968 |
| [33] | | Great Britain |
| [31] | | 4176/68 |

[54] SPRING-APPLIED BRAKE MECHANISMS
9 Claims, 3 Drawing Figs.

[52] U.S. Cl. ........................................ 92/63,
    92/64, 92/130
[51] Int. Cl. ........................................ F01b 7/04
[50] Field of Search ........................................ 92/128, 63,
    64, 130, 132, 133, 68, 165, 166, 113; 188/115,
    120

[56] References Cited
UNITED STATES PATENTS

| 3,101,219 | 8/1963 | Herrera .......................... | 303/6 |
| 3,109,347 | 11/1963 | Brodl ............................ | 92/113 |
| 3,136,227 | 6/1964 | Williams ....................... | 92/130X |
| 3,187,642 | 6/1965 | Cruse ............................ | 92/64X |
| 3,244,079 | 4/1966 | Herrera ......................... | 92/64X |
| 3,302,530 | 2/1967 | Dobrikin et al. ............... | 91/440 |
| 3,372,623 | 3/1968 | Wearden et al. ............... | 92/64 |

*Primary Examiner*—Martin P. Schwadron
*Assistant Examiner*—Leslie J. Payne
*Attorney*—Norris and Bateman

ABSTRACT: A vehicle braking system comprising an air pressure operated brake motor and a spring-applied fluid pressure released motor combined as a unit, said unit including in the spring motor a central sleeve movable with the piston thereof and in screw-threaded connection with a hollow release screw, said screw having operative connection with a push rod by which the thrust of the unit is transmitted to the brake linkage, and means for rotating the release screw to effect further movement of the piston beyond the "brakes-on" position to decompress the piston loading spring and release the brakes.

SPRING-APPLIED BRAKE MECHANISMS

This invention relates to spring-applied brake mechanisms as used in conjunction with a compressed air actuated braking system for vehicles, that is, of the kind embodying in association with a compressed air brake motor a coaxially arranged spring-loaded piston and cylinder device of which the piston is connected to the brake linkage and is acted upon by a supply of compressed air such that it is normally held in an inoperative position but, on failure or other interruption of said supply, said piston moves under the action of its loading spring to apply the associated brake.

With known mechanisms of this character, failure of the compressed air supply holding the spring brake in the inoperative condition causes the brake to be applied and maneuvering of the vehicle, in the case of a trailer, becomes impossible unless an external source of compressed air is available or the spring brake can be released mechanically. It is an object of the present invention to provide means in a braking mechanism of the kind mentioned for rendering the spring brake temporarily inoperative in a simple and reliable manner and without the use of a supply of compressed air.

It is also an object of the invention to provide an improved spring-applied brake mechanism of the kind mentioned which can be assembled, dismantled and serviced in a safe and reliable manner and without risk of release of violent forces.

According to the invention a spring-applied brake mechanism of the kind mentioned includes a central sleeve movable with the piston, a hollow release screw having screw-threaded connection with said sleeve and extending beyond one end of the cylinder, a push rod disposed within said release screw and adapted to be connected to the brake to be actuated, and means for transmitting the thrust of the air motor to said push rod, said release screw, after spring displacement of the piston to apply the brake, being operable to effect a further displacement of the piston and relative to said thrust-transmitting means and push rod, to decompress the piston loading spring.

Reference will now be made to the accompanying drawings which illustrate by way of example three embodiments of the invention, the three FIGS. showing respectively the said embodiments in part axial section.

Referring first to FIG. 1, the unit is of conventional form in that it comprises a compressed air operated diaphragm-type motor M having a two-part casing 1a, 1b, the component 1a being bolted to a coaxial cylinder 2 within which is disposed a piston 3 loaded by the brake-actuating spring 4, which is interposed between the piston and a radial partition structure 5 formed integrally with the component 1a. This piston 3 is formed with a central sleevelike extension 6 on the rear or free end of which is mounted a heavy circlip 7 or equivalent removable abutment which coacts with a flanged extension 8 on the partition 5 to limit forward movement of the piston, that is, in the direction to apply the brake. The sleeve 6 is screw-threaded internally and engaged by the threaded head 9a of a tubular release screw 9, whilst extending coaxially through the diaphragm chamber of the air motor M and into said sleeve is a release bolt 10 of hexagonal, square or other noncircular cross section, this bolt extending into a correspondingly shaped bore in the screwhead 9a such that screw 9 can be rotated by rotating the bolt. The diaphragm 11 of the air motor together with a pressure plate 12 is rotatably mounted on the rear end of the release bolt, the casing component 1a having an axial opening normally provided with a closure plug 13 and which provides access to the rear end of the release bolt which is formed with a hexagonal or equivalent head 10a so that the bolt can be turned with the aid of a spanner. A light spring 14 interposed between the pressure plate and a shoulder on the partition extension 8 normally holds the diaphragm in the retracted position shown when the device is inoperative.

The forward end of the release bolt has a ball and socket-type connection 15 with one end of a coaxial push rod 16 the other end of which is provided with means 17 through which thrust is transmitted to the brake linkage. The release screw 9 and push rod 16 extend through the forward end of the cylinder 2 where the release screw has a sealed sliding fit in a bush 18 in the cylinder wall and a gaiter 19 closes off the open end of the release screw. The forward end of the release bolt is also provided with a circlip 20 or equivalent abutment which coacts with a shoulder 21 on the head of the release screw such that forward movement of the piston 3 is transmitted through sleeve 6, release screw 9 and circlip 20 to the release bolt 10 and thence to push rod 16.

The mechanism operates as follows:

Normally, compressed air from the emergency line of a two-line braking system is admitted through port 22 to the forward end of the cylinder 2 and holds the piston 3 in the retracted position shown with the spring 4 compressed. When service line pressure is applied at a port connection 23 to the rear end of the diaphragm chamber, the diaphragm is displaced forwardly, transmitting a thrust through the release bolt 10 and push rod 16 to the brake-actuating linkage, the bolt sliding through the tubular release screw which remains stationary with the piston.

Should emergency line pressure fail, the piston will move forwardly in cylinder 2 under the expansion of the loading spring 4, its integral sleeve 6 taking along with it the release screw 9 by reason of the screw-threaded connection therewith and thus the thrust is transmitted to the push rod 16 and brake linkage. Upon application of the brakes by the spring 4, the provision of circlip 20 and shoulder 21 causes the service diaphragm assembly also to be pulled forward.

Thus in the absence of air pressure to the forward end of cylinder 2, the brakes are applied and, should it then be necessary to release the brakes, the rear end of the release bolt 10 is uncovered and the bolt rotated in a direction to cause the release screw 9 to travel rearwardly relative to the sleeve 6. As this movement progresses the piston 3 and sleeve 6 will travel forwardly in the cylinder 2 until the circlip 7 on the sleeve contacts the flanged extension 8. By this time the tension on spring 4 has been removed and the brakes have been released thus rendering the vehicle maneuverable. When required, the release is again actuated to drive the release screw rearwardly until the diaphragm 11 is returned to its original position and spring 4 has again been placed in a state of compression. The return of the diaphragm to its operative position in this manner is an important feature of this construction as it ensures that the service brake is operable after loss of emergency air line pressure.

Figure 2:
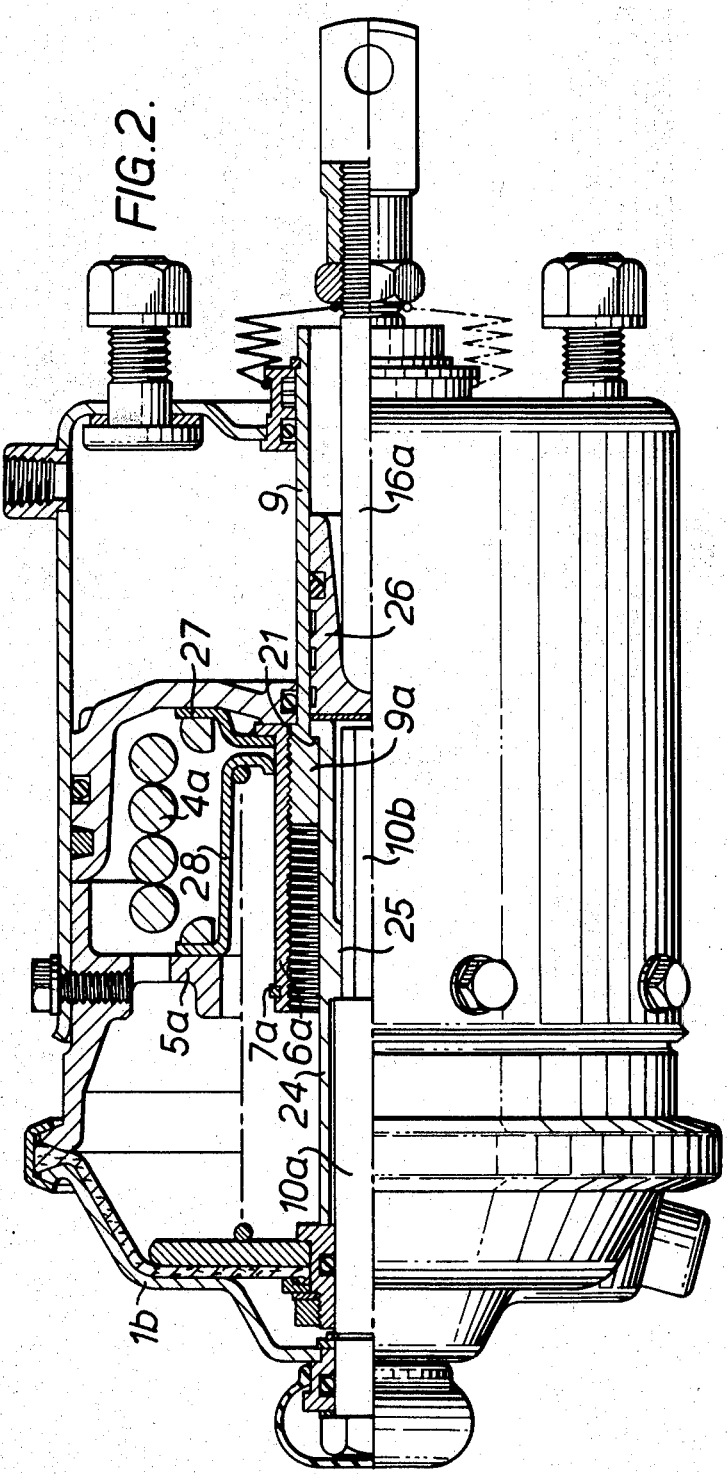

In the construction shown in FIG. 2, the release bolt 10a is supported for rotation in the casing component 1b of the motor M but is not axially displaceable. The bolt is enclosed by a tubular component 24 and has a front end portion 10b of hexagonal or other noncircular cross section engaging closely within a correspondingly formed land 25 on the component 24 to form a rotative connection between these members. The head 9a of the release screw 9 has a rotative connection with component 24 similar to that between said component and the release bolt, and the forward end of the tubular component is flanged to engage the shoulder 21 on the release screw whereby on forward displacement of the release screw by the piston, the screw takes the component 24 along with it. The forward end of the tubular component abuts, preferably through a thrust washer, a socketed member 26, which is slidable in the release screw and receives the end of a push rod 16a by which thrust is transmitted to the brake linkage.

An important feature of this construction is that the piston loading spring together with its associated abutment and supporting members is formed as a cell which is removable as a unit from the cylinder so permitting assembly and dismantling away from the brake actuating unit. In this construction, the sleeve 6a, in screw-threaded connection with the head of the release screw, is formed separately from the piston but is held in abutment therewith by the spring cell. As shown, the spring cell comprises the heavy coiled compression spring 4a held between a pair of abutment plates 27, 28 conveniently formed as dished steel dressings, plate 27 being welded to a flange on the end of sleeve 6a whilst plate 28 can slide along the sleeve to a limit position where it engages the circlip 7a. In use, the compressive force in the spring holds the cell firmly in position between the piston and the partition 5a and also clamps the sleeve 6a firmly to the piston. However, when the spring cell is extended, it can be readily removed from the cylinder after detaching the diaphragm housing, and thereafter the cell can be safely dismantled, using a press or vice if necessary. In operation of the service brake the thrust of the diaphragm is transmitted through the tubular component 24 sliding over the release bolt and within the release screw but subject to this and the other modifications above described, this unit follows closely the construction shown in FIG. 1 and its mode of operation will be clearly understood from the description of that unit.

Figure 3:
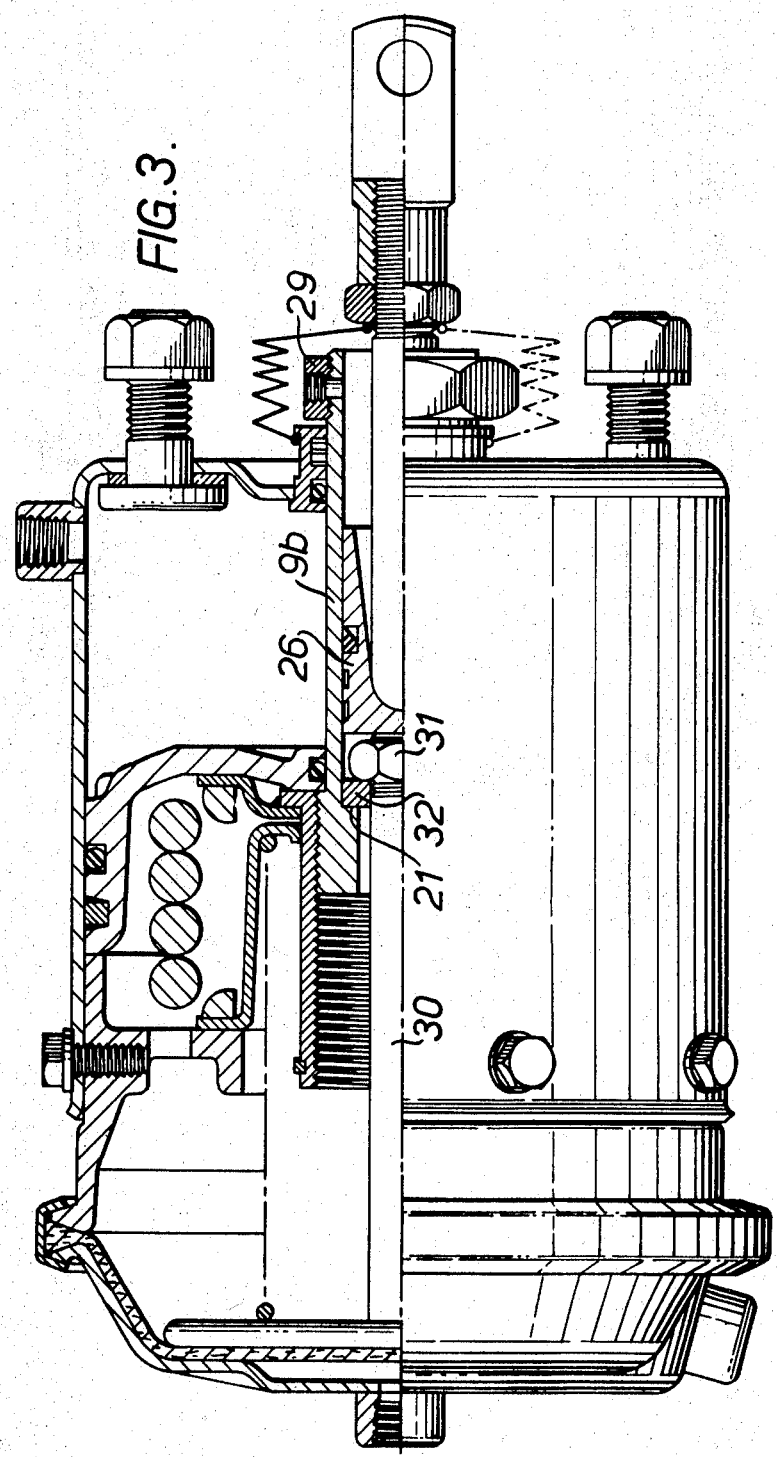

FIG. 3 illustrates an arrangement which follows closely the construction according to FIG. 2 but in which the release screw 9b is extended forwardly beyond the end of the cylinder and, externally of the cylinder, is provided with a nut 29 or equivalent means such that the release screw can be rotated by a spanner, tommy bar or similar tool to decompress the loading spring. The construction and operation of the unit including the spring cell is as previously described but, as the release screw is rotated directly, a rotatable release bolt is no longer required. As shown, the diaphragm and pressure plate assembly is secured to a simple thrust rod 30 which at its forward end abuts the socketed member 26 and also supports behind a nut 31 a washer 32 which engages the shoulder 21 on the release screw to form a thrust transmitting connection between this screw and the rod 30.

We claim:

1. In a brake operating mechanism, means defining a cylinder, a piston movable in said cylinder, spring means at one side of the piston, means for introducing fluid under pressure into said cylinder at the other side of said piston to displace said piston in one direction to compress said spring means and to hold said piston in retracted position, said spring means being operable to expand and displace said piston in the other direction when said holding fluid pressure is released, a central sleeve movable with the piston, a hollow release screw having screw-threaded connection with said sleeve and extending beyond one end of the cylinder, a push rod disposed within said release screw and adapted to be connected to the brake to be actuated, a fluid pressure responsive motor operably connected by thrust transmitting means to said push rod for normal service actuation of said brake, and means including said sleeve and release screw operably connecting said piston to displace said push rod in the brake applying direction when the piston is displaced by said spring means, said release screw, after spring displacement of the piston to apply the brake, being operable to effect a further displacement of the piston relative to said push rod to decompress said spring means.

2. A brake mechanism as claimed in claim 1, wherein the release screw includes a head which externally has screw-threaded connection with the bore of the central sleeve, the said screwhead being rotatable by coaxially disposed actuating means operable from the other end of the cylinder.

3. A brake mechanism as claimed in claim 2, wherein said screw actuating means consists of a release bolt of noncircular cross section, the head of the release screw being formed to have a sliding but nonrotative fit on said bolt.

4. A brake mechanism as claimed in claim 3, wherein the release bolt carries a diaphragm of said fluid pressure motor and provides a thrust-transmitting connection between the diaphragm and said push rod.

5. A brake mechanism as claimed in claim 2, wherein said screw actuating means consists of a tubular component which externally is of noncircular cross section and has a sliding but nonrotative fit within the head of the release screw, and a release bolt at least a part of which is of noncircular cross section and which has a sliding but nonrotative fit within part of the tubular component.

6. A brake mechanism as claimed in claim 5, wherein the tubular component provides the thrust-transmitting connection between said motor diaphragm and the push rod.

7. A brake mechanism as claimed in claim 1, wherein the release screw is provided externally of the cylinder with gripping means by which said screw may be rotated.

8. A brake mechanism as defined in claim 10, wherein said spring means together with associated abutment and supporting members is formed as a cell which is removable as a unit from the cylinder.

9. A brake mechanism as claimed in claim 8, wherein the spring cell unit consists of a coiled compression spring held between a pair of abutment plates one of which is secured to the central sleeve whilst the other is capable of limited sliding movement on the sleeve, said unit being inserted between the piston and a fixed partition structure and also being operable to hold the central sleeve in operative engagement with the piston.